United States Patent
B et al.

(10) Patent No.: US 10,747,785 B2
(45) Date of Patent: Aug. 18, 2020

(54) METHOD AND SYSTEM FOR EFFICIENT CLUSTERING OF COMBINED NUMERIC AND QUALITATIVE DATA RECORDS

(71) Applicants: Aravindakshan B, Chennai (IN); Sudarshan B, Chicago, IL (US); Hariharan Chandrasekaran, Chennai (IN)

(72) Inventors: Aravindakshan B, Chennai (IN); Sudarshan B, Chicago, IL (US); Hariharan Chandrasekaran, Chennai (IN)

(73) Assignee: Mad Street Den, Inc., Fremont, CA (US)

( * ) Notice: Subject to any disclaimer, the term of this patent is extended or adjusted under 35 U.S.C. 154(b) by 286 days.

(21) Appl. No.: 15/801,214

(22) Filed: Nov. 1, 2017

(65) Prior Publication Data
US 2019/0130017 A1 May 2, 2019

(51) Int. Cl.
*G06F 16/28* (2019.01)
*G06F 16/245* (2019.01)

(52) U.S. Cl.
CPC .......... *G06F 16/285* (2019.01); *G06F 16/245* (2019.01)

(58) Field of Classification Search
CPC .............................. G06F 16/285; G06F 16/245
USPC ........................................................ 707/737
See application file for complete search history.

(56) References Cited

U.S. PATENT DOCUMENTS

| 5,893,090 A * | 4/1999 | Friedman ............ G06F 16/2462 |
| | | 707/999.003 |
| 9,066,021 B2 * | 6/2015 | Jorgensen .......... G06K 9/00134 |
| 9,740,510 B2 * | 8/2017 | Bhatia ................. G06F 9/44505 |
| 2005/0222972 A1 * | 10/2005 | Mishra ................... G06F 16/355 |
| | | 707/E17.091 |
| 2014/0113383 A1 * | 4/2014 | Jorgensen ............ G02B 27/024 |
| | | 436/501 |
| 2015/0269412 A1 * | 9/2015 | Jorgensen ............. G06T 7/0012 |
| | | 382/134 |
| 2016/0291990 A1 * | 10/2016 | Bhatia ................. G06F 9/44505 |
| 2018/0375957 A1 * | 12/2018 | Lv .......................... H04L 67/322 |
| 2019/0027249 A1 * | 1/2019 | Fuksenko ................ G16B 5/00 |
| 2019/0130017 A1 * | 5/2019 | B .......................... G06F 16/285 |

OTHER PUBLICATIONS

Holmes et al. (Ultrafast Monte Carlo for Kernel Estimators and Generalized Statistical Summations, Georgia Institute of Technology, 2008, 8 pages. (Year: 2008).*

* cited by examiner

*Primary Examiner* — Phong H Nguyen
(74) *Attorney, Agent, or Firm* — Mersenne Law

(57) ABSTRACT

An optimized and efficient method of identifying one or more points within a dataset that are close to the centers of clumps similar records in a large, multi-element dataset uses Monte Carlo techniques to compute approximate clustering costs at significantly reduced computational expense. The inaccuracy caused by the approximate methods is also estimated, and if it is too high, the method may be repeated with a larger Monte Carlo sample size to improve accuracy.

12 Claims, 7 Drawing Sheets

METHOD AND SYSTEM FOR EFFICIENT CLUSTERING OF COMBINED NUMERIC AND QUALITATIVE DATA RECORDS

CONTINUITY AND CLAIM OF PRIORITY

This is an original U.S. patent application.

FIELD

The invention relates to computational techniques for processing numerous heterogenous data records. More specifically, the invention relates to efficient methods for evaluating large datasets by finding the medoids of clusters of similar records.

BACKGROUND

A variety of graphical representations have been developed to communicate the information in a dataset more effectively to an audience. For example, a pie chart can be used to show at a glance the relative proportions of several ingredients or sub-quantities that make up a whole, and a bar chart can show the development of a metric over discrete periods of time. A scatter chart can convey information about a plurality of observations of a pair of numeric quantities: the observations are plotted on a rectilinear graph, and the viewer can apprehend characteristics of the observations that would be harder to understand from simply examining a table of numbers. For example, FIG. 4 shows a simple scatter plot of 1,000 random X,Y pairs of numbers drawn from Gaussian distributions having means at (2,0) and (−2,0) (standard deviation=1). The centers of the two sets of numbers can be identified by inspection: the two higher-density clumps of the scatter plot appear to be centered around (−2,0) and (2,0).

When more than two quantities need to be represented on a scatter chart, they may be shown as different symbols or different colors on a two-dimensional plot, or as points in a three-dimensional volume, displayed by a sophisticated apparatus or mapped to a two-dimensional image through conventional computer-graphics processing. However, a direct-view representation of large numbers of records, comprising more than four or five quantities each, is cumbersome and impractical. For example, a multivariate data set collected by British statistician and biologist Ronald Fisher and published in his 1936 paper *The use of multiple measurements in taxonomic problems*, is often used to illustrate (and test) statistical data analyses. The data set consists of 50 samples from each of three species of Iris (*Iris setosa, Iris virginica* and *Iris versicolor*); each sample comprises measurements of the length and the width of the sepals and petals of the specimen, plus its species. A few example records are reproduced here, and the two-dimensional scatter plots of FIG. 5 show each measurement in relation to the others, with the species represented by different symbols in the plot.

| Sepal Length | Sepal Width | Petal Length | Petal Width | Species |
|---|---|---|---|---|
| 5.1 | 3.5 | 1.4 | 0.2 | Iris-setosa |
| 4.9 | 3.0 | 1.4 | 0.2 | Iris-setosa |
| 7.0 | 3.2 | 4.7 | 1.4 | Iris-versicolor |
| 6.4 | 3.2 | 4.5 | 1.5 | Iris-versicolor |
| 6.3 | 3.3 | 6.0 | 2.5 | Iris-virginica |
| 5.8 | 2.7 | 5.1 | 1.9 | Iris-virginica |

One of the species can be distinguished by inspection of many of the plots, but visually distinguishing all three species is virtually impossible. Nevertheless, a variety of statistical techniques (including embodiments of the invention described below) make quick work of this task—but only because the total number of data records is small.

The purpose served by a scatter graph—to highlight groups of similar or related observations—is an important approach to understand and use data sets containing extremely large numbers of records, each with many associated measurements, quantities or qualities. In particular, the ability to identify groups or clusters within observations that include both quantitative (numeric, often continuous) elements and qualitative (discrete) elements, is of substantial value in many fields. Unfortunately, popular techniques for emulating what a human accomplishes easily by looking at a two-dimensional scatter chart, are computationally expensive when performed on large (e.g., millions of records) datasets containing many characteristics per record. For example, the standard K-Medoids algorithm is an important and popularly-practiced clustering technique for mixed data. The basic and highest-quality K-Medoids routine is Partitioning Around Medoids, or "PAM." PAM is an iterative algorithm, iteratively seeking to improve the clustering quality. Unfortunately, it is computationally expensive. The cost of PAM is quadratic in the number of observations, a rate of growth that makes it infeasible for modern data set sizes. Existing PAM variants such as CLARA, CLARANS and pivot-based K-Medoids also suffer from various drawbacks. For example, CLARA can result in poor-quality clusters. Under the ubiquitous situation of constant number of iterations, CLARANS is also of quadratic cost. Further, CLARANS does not provide any formal or mathematical guarantees on the per-iteration quality vis-a-vis PAM. Pivoted K-Medoids only works for Euclidean metrics.

Approaches that reduce the computational complexity of clustering mixed data while offering theoretical guarantees on the quality of the results may be of substantial value in many fields.

SUMMARY

Embodiments of the invention efficiently identify clusters of similar records within large datasets containing records having a combination of quantitative or numeric elements and qualitative or discrete elements. The techniques require fewer computational resources than prior-art K-medoid methods, and provide theoretical quality guarantees. Practical applications for the clustered records are also described and claimed.

DETAILED DESCRIPTION

Embodiments of the invention apply the well-known statistical tool Monte Carlo Analysis to the specific task of finding clusters of related or similar records within a large dataset. It is beyond the scope of this disclosure to provide a full explanation and derivation of Monte Carlo methods and results[1]; it suffices to say that the methods facilitate the efficient analysis of large datasets containing observations having any statistical distribution: one can quickly obtain the approximate mean of the distribution, and an estimate of how close the approximate mean is to the true mean. The possibility to obtain an estimate of the error is a startling result in Monte Carlo theory, but it is put to practical use in the present invention.

Figure 7:
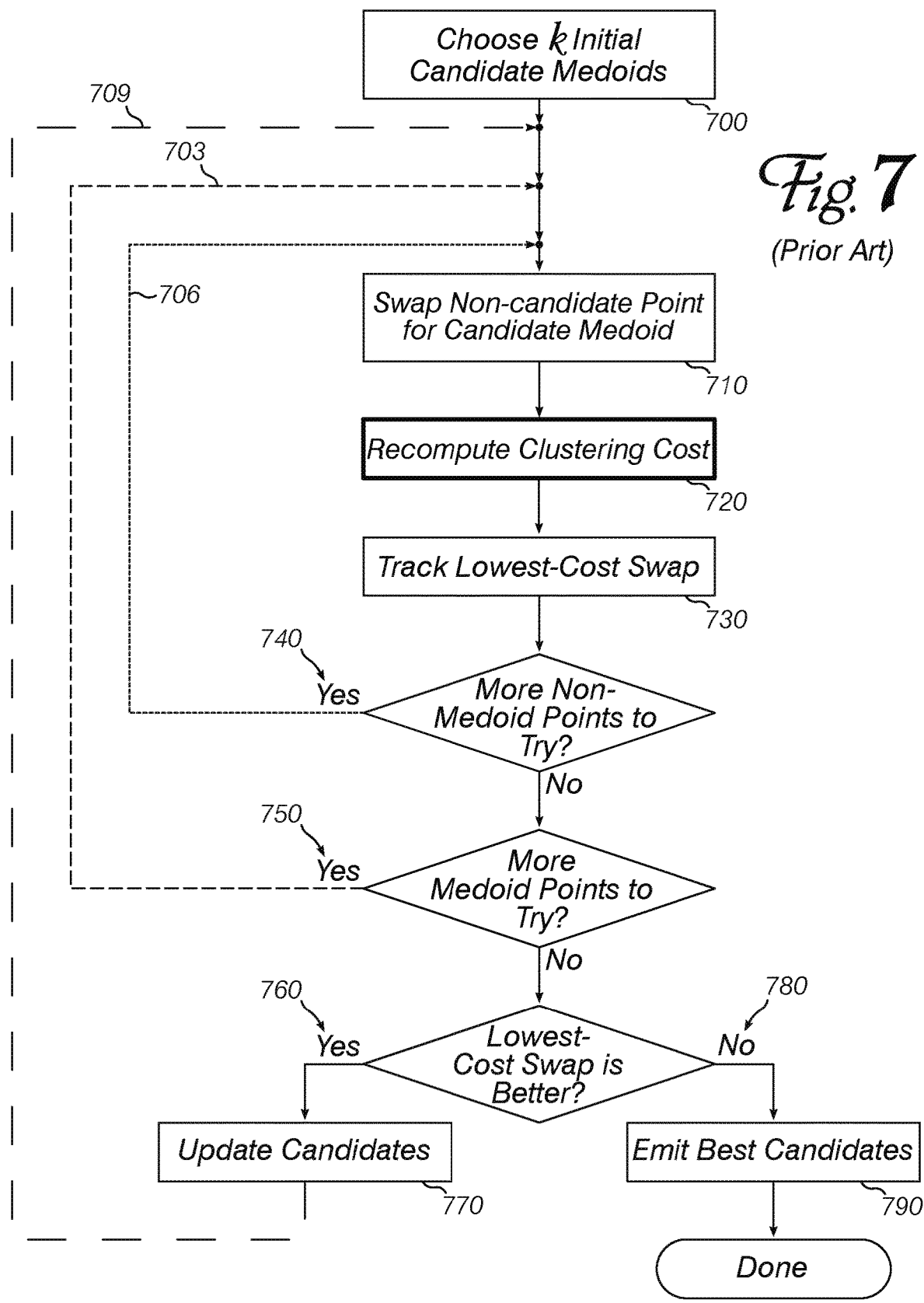
FIG. 7 outlines a prior-art method for finding medoids of a dataset.

[1] The interested reader may wish to refer to *Ultrafast Monte Carlo for Kernel Estimators and Generalized Statistical Summations* by Holmes, Gray & Isbell, available at: https://papers.nips.cc/paper/3166-ultrafast-monte-carlo-for-statistical-summations.pdf The problem of "finding clusters within a dataset" may be more precisely stated as the problem of finding representative points or "medoids" within the dataset such that the overall clustering cost is at a minimum, where the clustering cost is the sum of the distances from each point to its nearest medoid. FIG. 7 outlines the prior-art "Partitioning Around Medoids" or "PAM" algorithm for solving this problem. Starting with a dataset containing $n$ elements, $k$ elements are chosen to be the initial candidate medoids (700). Now, we iteratively search for an improvement over the current candidate medoid set.

For a given candidate medoid set, an improvement is searched for as follows. In the doubly-nested loop (700, 706), one of the $k$ candidate medoids is swapped with one of the ($n-k$) non-candidate points (710), and the clustering cost is recomputed (720). This computation is somewhat expensive: it involves calculating the distance for each of $n$ points, so it is of order $n$ ("$O((n)$").

The inner loop 706 continues as long as there are more non-medoid points to try (740) for the current medoid (a total of $n-k$ trial swaps). The outer loop 703 processes each of the $k$ candidate medoids (750). Thus, in the doubly-nested loop, a total of $k \times (n-k)$ swaps are examined, and the lowest-clustering-cost swap among these is tracked (730). The total cost of the doubly-nested loop (703, 706) is $O(k \times n^2)$. This search has exhaustively examined the space of single-medoid swaps on the current medoid set and is a high-quality, high-cost search.

In the outermost loop (709), we check if the minimum clustering cost from the double loop (703, 706) is less than the clustering cost of the current candidate medoid set. If the cost has declined (760), then we have found a better set of candidate medoids so we update the candidate medoid set (770) and re-start the double loop (703, 706) with the improved candidate medoid set. Otherwise (780), the method has converged and the program is terminated (emitting the current—and best—candidate medoid set (790)).

In practice, the outermost loop usually only iterates a few times, and the number of iterations does not depend on the size of the dataset, $n$. Thus, PAM is an $O(k \times n^2)$ algorithm: although it produces high-quality results, it is a high-cost algorithm—quadratic in $n$.

Figure 1:
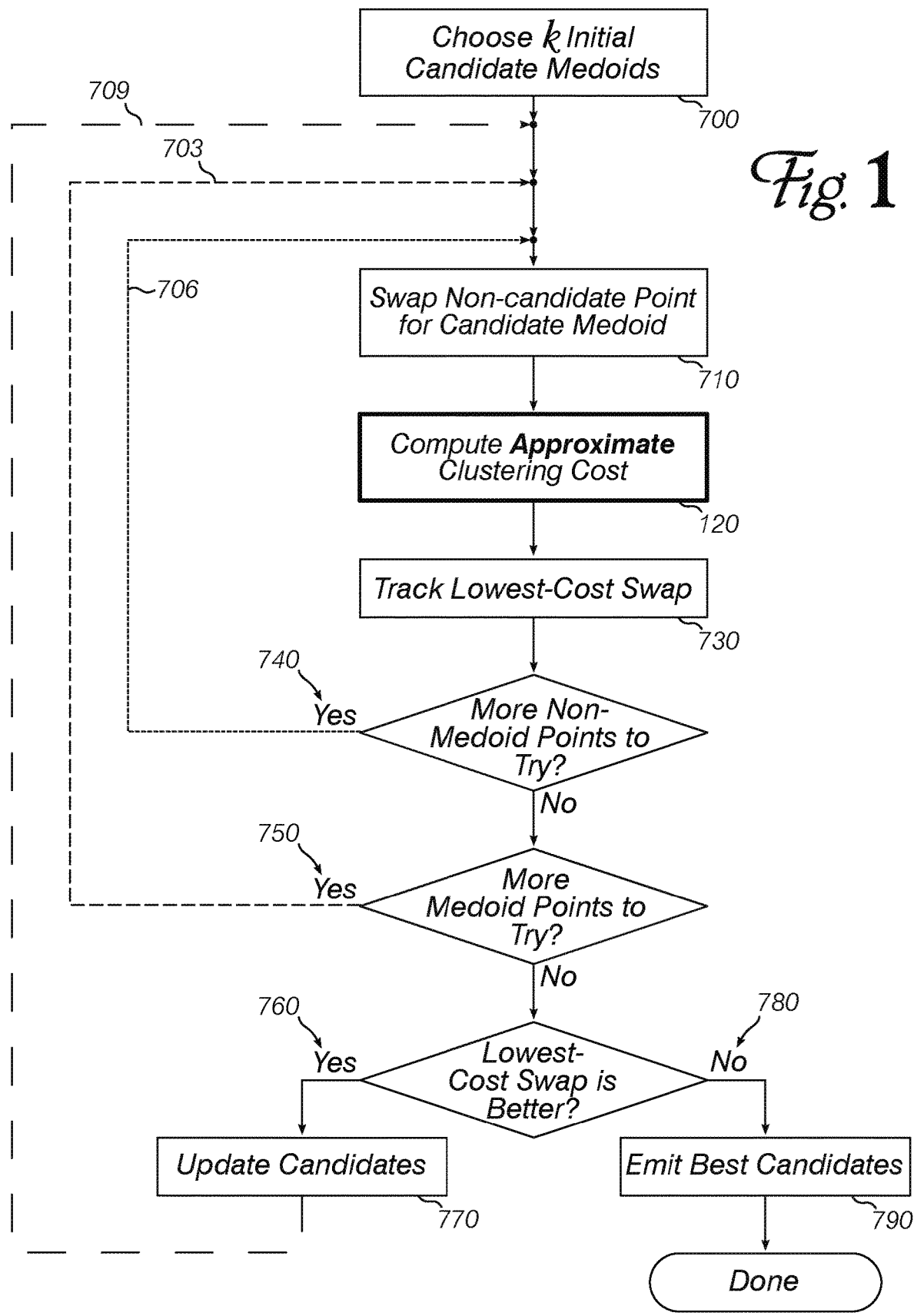
FIG. 1 outlines a data-analysis method according to an embodiment.

A basic embodiment of the invention dramatically reduces this computational cost by following the method outlined in FIG. 1. The method is almost identical to PAM (FIG. 7), except for the computationally-expensive clustering-cost calculation at 720. In an embodiment of the invention, Monte Carlo methods are used to compute an approximate clustering cost (i.e., an estimate of the true clustering cost) (120). The estimate is made by selecting a subset from the full dataset and computing the sum of distances from each member of the subset to its nearest candidate medoid. Since the subset contains fewer points than the full dataset, this computation is faster. Thus, the search for optimal medoids (or, technically, approximately optimal medoids) can be completed more quickly.

The use of only s sample elements from the dataset in computing the approximate clustering cost means that the cost used in evaluating candidate medoids will not be exact, but Monte Carlo analysis permits an estimate of the error introduced by using fewer than all data points. If the error is unacceptably large, the process may be repeated with a larger value of s. For example, the next iteration may use 2s or 10s sample points. It is appreciated that the value of s required to achieve a particular level of accuracy does not depend on the size of the dataset. Instead, it depends on the distribution of the points in the dataset, and how accurately the distribution of a randomly-chosen subset reflects the distribution of the full dataset. In the inventors' experience, values of s between 100 and 10,000 produce results of adequate accuracy for arbitrarily large datasets.

Figure 2A:
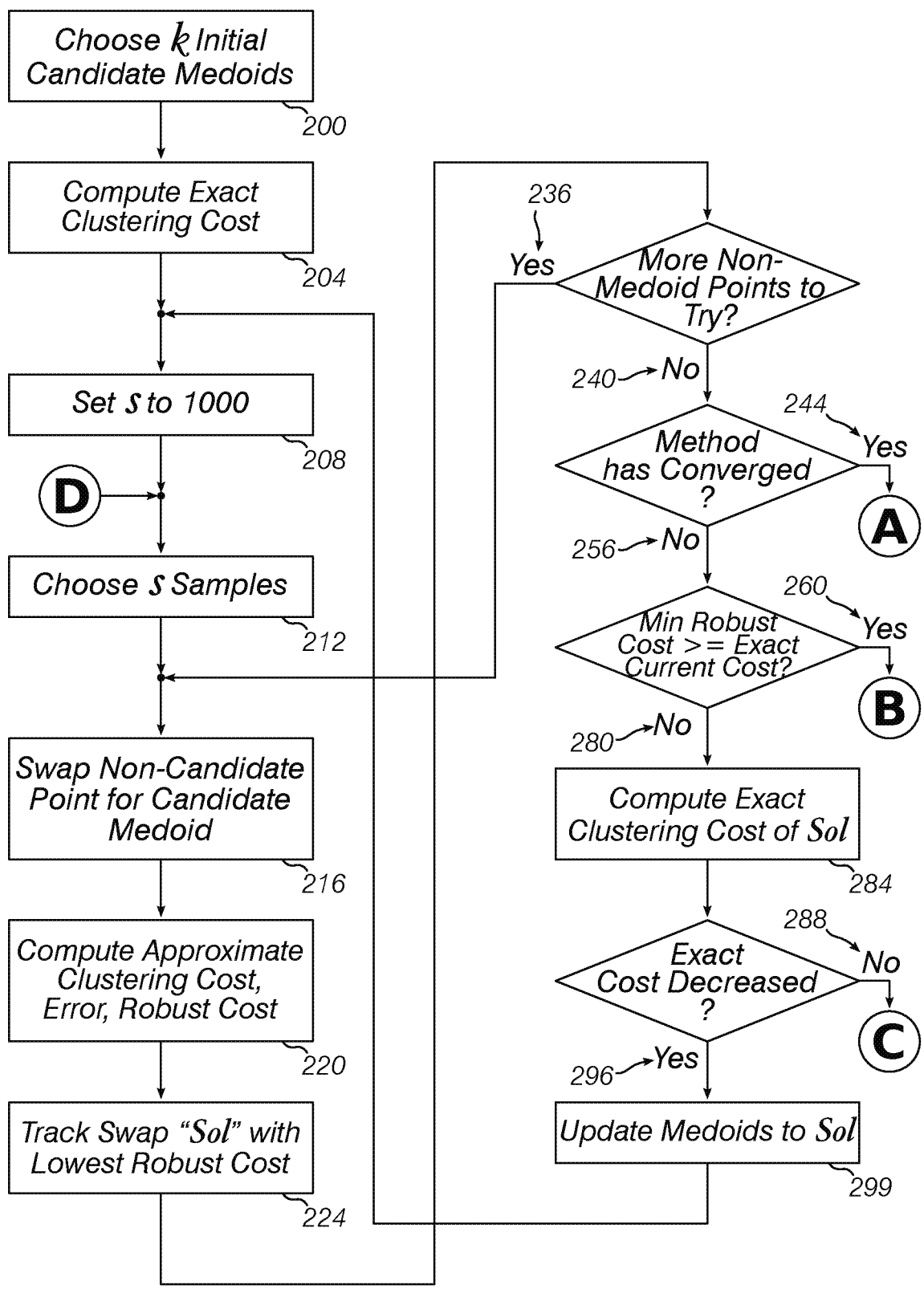
FIGS. 2A and 2B present a further-improved data-analysis method according to an embodiment.
Figure 2B:
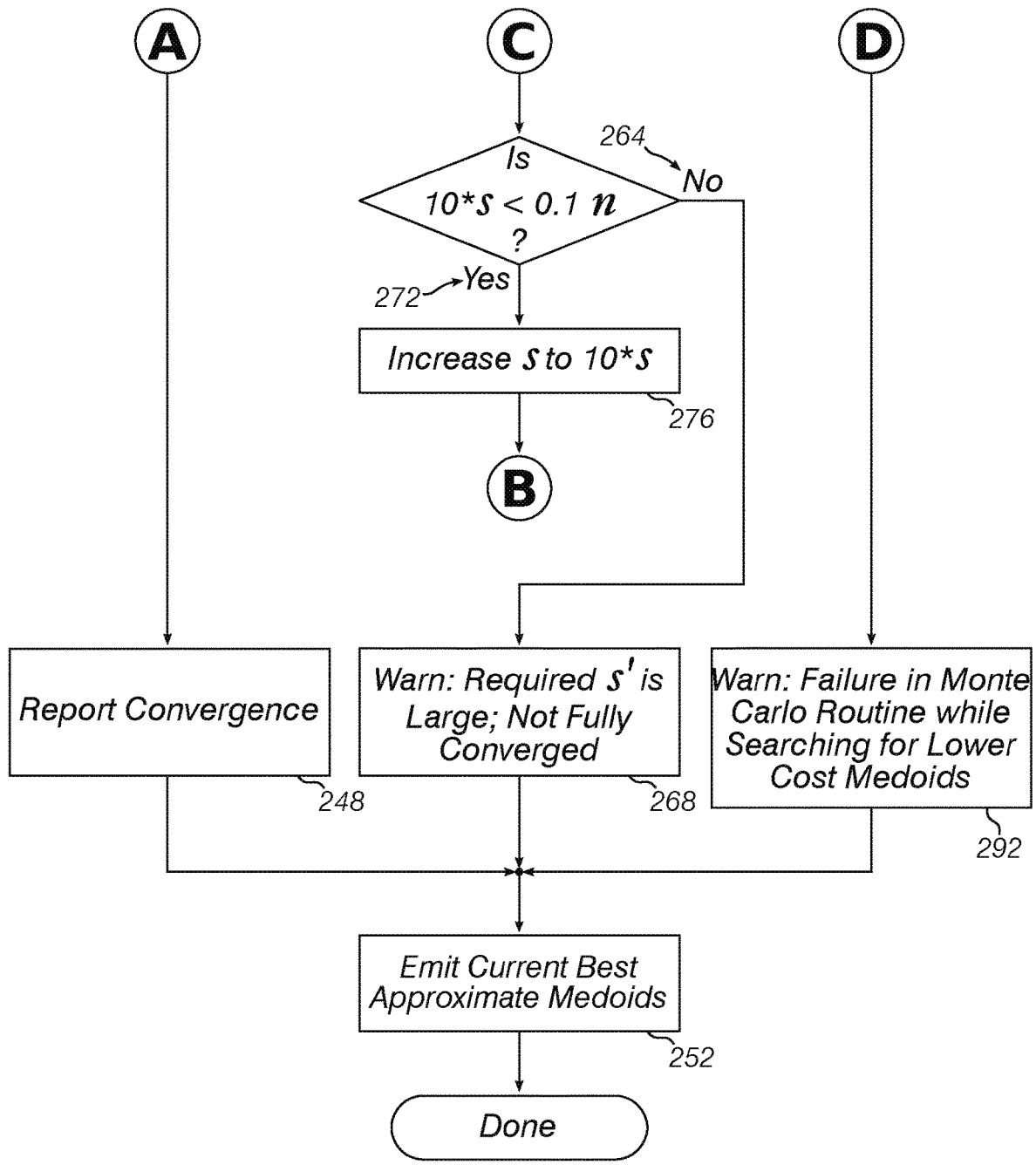

The basic embodiment described with reference to FIG. 1 works entirely with approximate clustering costs. That is, we are checking if the approximate clustering cost of the current iteration is lower than the approximate clustering cost of the previous iteration. Statistically, this is more fraught with error than if we compare against the exact clustering cost of the previous iteration. Interestingly, calculating the exact clustering cost once per iteration does not increase the big-O computational cost. This and other statistical innovations are added to the basic embodiment to get the embodiment described in FIGS. 2A & 2B.

Starting with the same $n$-element dataset, $k$ points are chosen to be the initial candidate medoids (200). The exact clustering cost (i.e., the cost computed identically to the prior art as the sum of the distances from each of the $n$ points to the nearest of the $k$ candidate medoids) is computed (204). Now, the Monte Carlo subset size, s, is initialized to an integer chosen by the implementer (in this example embodiment, it is set to 1,000) (208).

S samples are chosen from the full $n$-record dataset (212). This choice is made with replacement, so there is a chance that a data point might be chosen for the Monte Carlo sample set more than once. (In addition, s might be chosen larger than $n$. This does not change the operation of an embodiment or the guarantees of accuracy or calculation of cost.) Now, a non-candidate-medoid point (from full set $n$, less the current $k$ candidates) is chosen to swap with a candidate medoid (216). The approximate clustering cost is computed as the sum of the distances from each of the s sample points to the nearest of the updated $k$ candidate medoids (220). This calculation also produces an estimate of the cost error introduced by using only s of the $n$ points. With this error estimate, a robust approximate clustering cost ("Robust Cost") can be calculated as a desired confidence above the approximate clustering cost. In other words, the robust clustering cost of this swap is the approximate clustering cost, increased by an amount such that the true or exact clustering cost of this swap (if it were computed) would be less than the robust clustering cost, with probability α. A suitable value for α might be, for example, 85%.

The swap with the lowest robust cost (called "Sol") is tracked as the process continues (224). If there are more non-medoid points to try swapping for a candidate (236), then the process continues with the next non-candidate-medoid point (216). Please note, there are $k \times (n - k)$ swaps to try in total.

Once all the possible swaps have been tried (240), the lowest-robust-cost swap, Sol, (from 224) is considered to decide whether the method has converged. Convergence is indicated when the estimated error in the approximate clustering cost of the best swap is small in relation to the estimated cost of the swap (i.e., the cost of the swap has been estimated with high accuracy), and when the approximate clustering cost of the best swap is not significantly better than the exact clustering cost of the current best set of medoids (from 204, or in later passes, from 272). If both conditions are satisfied, then the method has converged (244), so the convergence is reported (FIG. 2B, 248) and the best approximate medoids are reported to the user (252).

If the method has not converged (256) and the minimum robust cost is not less than the exact current cost (i.e., s is too small) (260) then the method may increase the size of s (276) and a new pass may begin with choosing additional samples (212). Alternatively, if the current size of s exceeds a threshold such as 10% of the full dataset size (264), then the user may be warned that the statistical distribution of the dataset is such that Monte Carlo methods require the processing of an unreasonably large proportion of samples (268) before the current-best medoids are returned (252).

Finally, if the method has not converged, but only because the estimated clustering cost of the current best swap provided a significant improvement over the exact clustering cost of the previous best medoids (280), the exact clustering cost for the best solution Sol is computed (284). If the exact cost has not decreased (288), then the method may terminate with a warning indicating that although the estimated clustering cost had decreased, the actual (exact) cost had not decreased (292). This uncommon situation may indicate that the Monte Carlo routine has failed at estimating the cost of the swaps—potentially as a result of a stray sampling issue. Instead of reporting the warning (292), an embodiment may simply re-sample the dataset (212) and try again.

If the exact clustering cost of Sol has decreased from the previously-computed exact clustering cost (296), the method has made progress towards finding a better set of candidate medoids. Thus, the current candidates are replaced with Sol (299) and another pass is started.

The foregoing method takes $O(k \times n \times s)$ to evaluate improvements for a given medoid set. Since s is independent of $n$ and $k$, we can write this cost as $O(k \times n)$. Compare this to $O(k \times n^2)$ for PAM to evaluate the improvement for a given medoid set. Further, the amount of error in the approximate cluster costs is independent of $n$ and solely dependent on the distribution of the data and s. That is, the method provides a theoretical guarantee that we can control the error in the clustering cost by choosing s appropriately. Whereas other embodiments can dynamically choose s to bound the error, the embodiment described here uses the simple strategy of initializing s to 1,000 (and optionally increasing it if necessary). We find that in practice, this simple strategy works well and that the error is well-bounded (without necessity of re-sampling the data or increasing the sample size). This in turn guarantees that for a given medoid set, the cost decrease achieved by the inventive method is within a small tolerance of the cost decrease achieved by PAM. This in turn guarantees that the number of outer iterations of the present method is also small and independent of $n$. The inventors have confirmed these claims in practice by clustering real-world datasets having hundreds of observations and having tens of millions of observations. Further, on the small dataset their results were verified by comparing with results from standard PAM.

Figure 3:
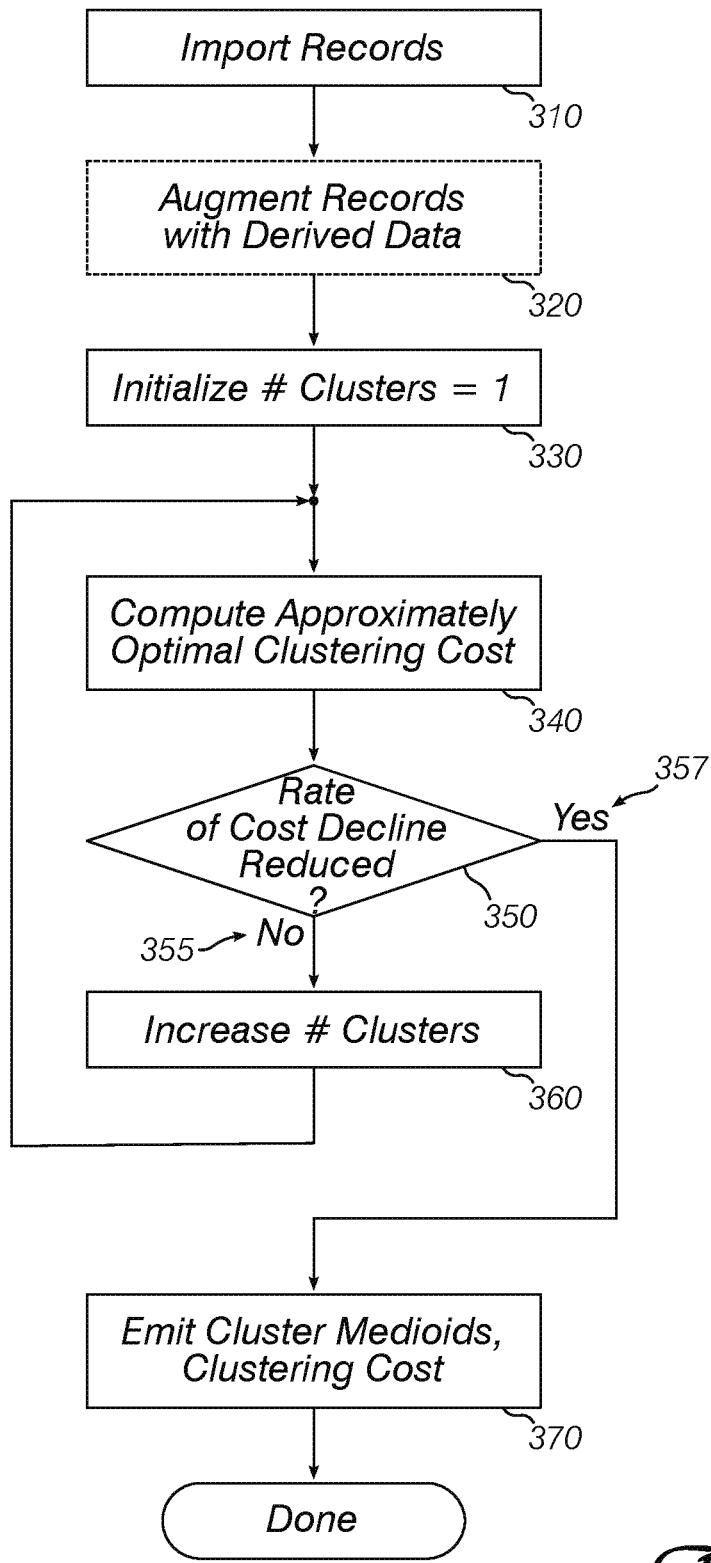
FIG. 3 outlines a broader method that incorporates the data analysis method of FIG. 1 or FIGS. 2A and 2B.
Figure 4:
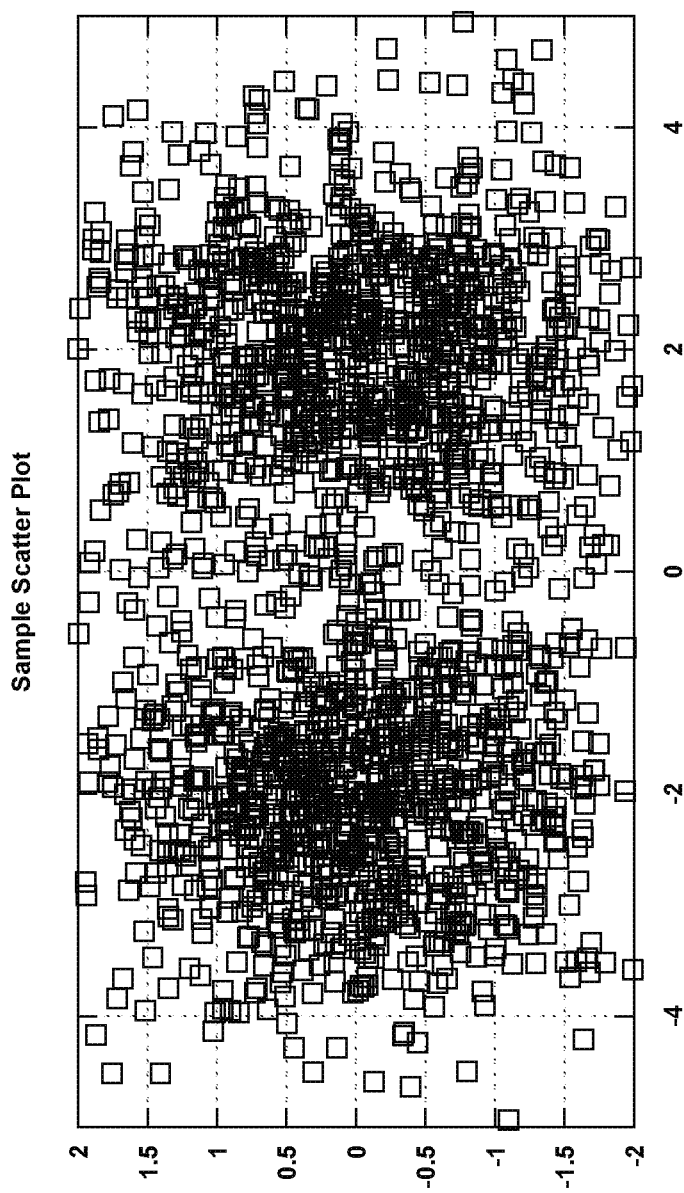
FIG. 4 is an example scatter chart that can be evaluated by inspection.
Figure 5:
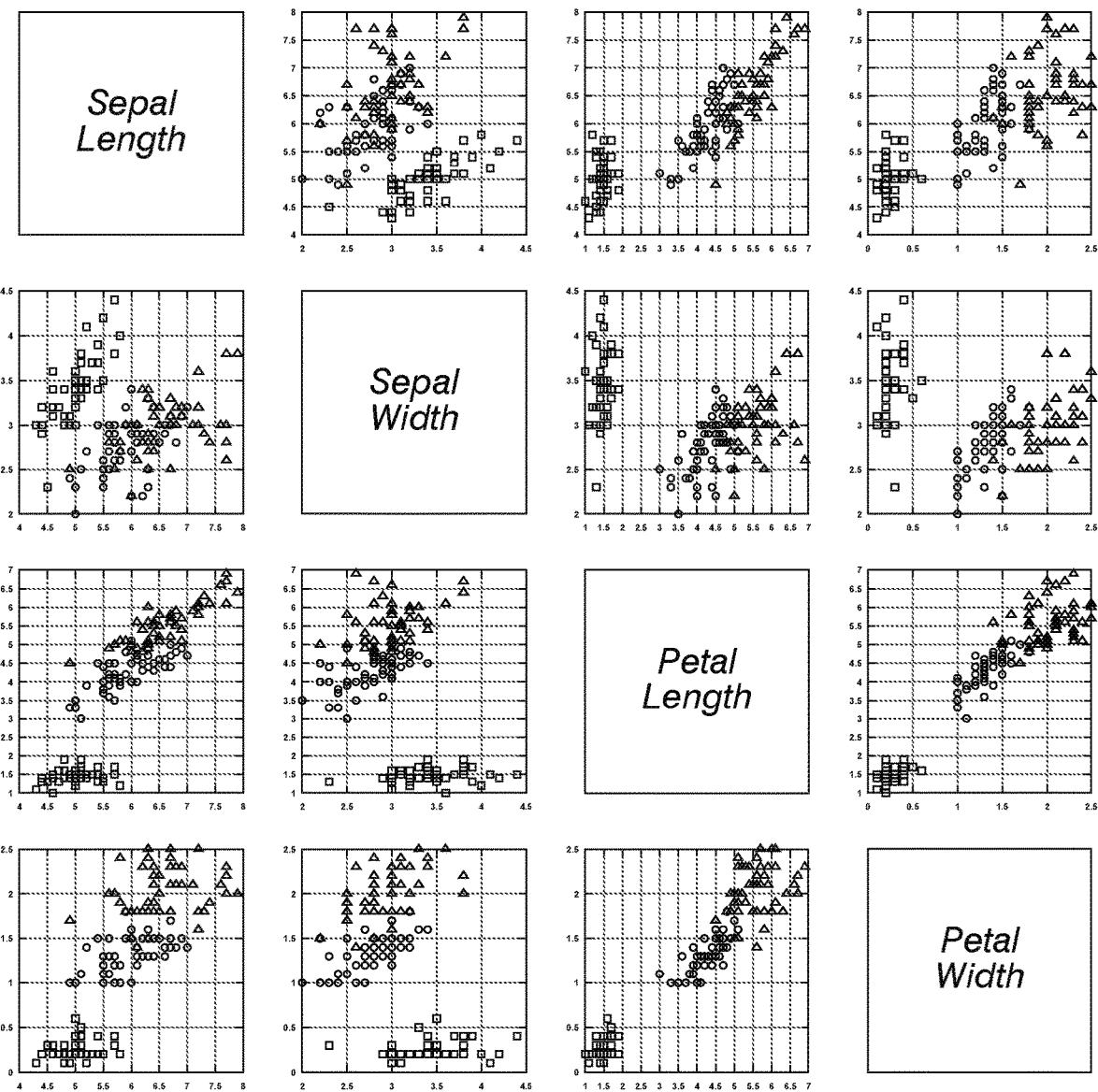
FIG. 5 shows a set of scatter charts prepared from a well-known, multi-element dataset.

But what if the number of clusters is unknown? An embodiment of the invention may use approximate clustering costs to determine a suitable number for $k$ by following the method outlined in FIG. 3.

The dataset records are imported from a source in preparation for further processing (310). These records may be augmented with data derived from the imported data, or with other information to improve processing results (320). For example, records comprising an Internet Protocol ("IP") address may be supplemented with a geolocation estimate corresponding to the IP address. Records comprising a timestamp may be adjusted to reflect a local time in a different time zone (perhaps the time zone corresponding to a geolocation estimate).

Next, the number of clusters, $k$, is initialized to one (330) and the central method of an embodiment (e.g., of FIG. 1 or FIGS. 2A & 2B) is employed to determine the approximately-best $k$ medoid(s) and the corresponding clustering cost (340). This cost is compared to the cost from a previous iteration (350) and if the rate of cost decline has not fallen (355), then $k$ is incremented (360) and the process is repeated. (Note that there is no previous-iteration cost when $k=1$, so 350 is skipped and the process simply continues with $k=2$.)

Figure 6:
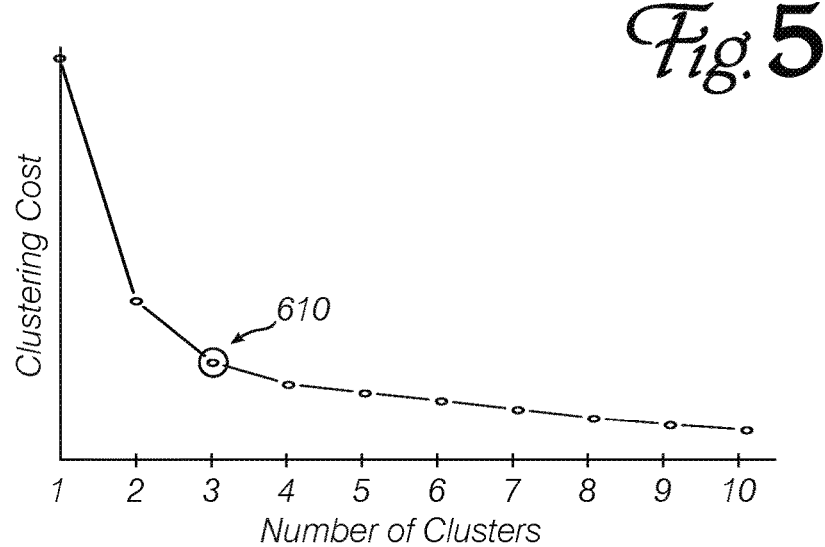
FIG. 6 shows how an appropriate number of medoids can be chosen for a dataset comprising multiple records.

If the rate of cost decline between the $k$ best medoids and the $k$ k+1 best medoids has declined (357) then the $k$ best medoids are emitted, along with the corresponding approximate clustering cost (370). This is similar to the "elbow method," so-named because it seeks the "elbow" of the curve representing clustering cost vs. number of medoids. For example, FIG. 6 shows the clustering cost computed according to an embodiment of the invention for the "Iris" dataset. The "elbow" occurs at $k=3$ (610), which corresponds to the three iris species represented in the dataset.

Clustering cost, used at various points in the foregoing methods, may be formally defined as the sum of the distances between each point of the dataset (or each of the s points of a randomly-chosen subset) and its nearest medoid. For numerical record elements, the distance has a straight-forward interpretation: it is simply the difference between the record element and the corresponding medoid element. For multiple numerical record elements, this is the Euclidean distance between the record and the medoid, $\sqrt{\Delta a^2 + \Delta b^2 + \ldots + \Delta z^2}$. (It is appreciated that other metrics are also suitable for use with numerical record elements. Any scalar function of pairs of dataset points can be used instead.)

For non-numerical record elements, the Gower Similarity metric may be used. This technique permits mixed records to be evaluated for similarity, with a numeric output that can be summed or compared to determine which of two pairs of mixed records are "closer together" (for purposes of interest to the user). Various non-numeric elements can be weighted differently, so that (for example) records of purchases of a red or a blue shirt on the same day, may be considered "closer together" than records of purchases of two green shirts on different days.

The methods described above can be applied to many different datasets, but to provide a concrete and useful example for the following discussion, we will consider a dataset of observations from a busy electronic-commerce website. Each observation describes one event or occurrence between the website and its users. For example, an observation comprises a timestamp, a client IP address, a user ID, a URL, a product category, a product ID, a price and a client action such as "viewed," "put in shopping cart," "removed from shopping cart," "purchased," "reviewed," "canceled," "returned" and so forth. Observations comprise both quantitative elements (i.e., values that can be ordered deterministically [e.g., numerically], such as timestamps and prices), and qualitative elements (i.e., values which do not have an arithmetic-based comparison function, such as product category and client actions).

By applying a clustering method according to an embodiment of the invention to e-commerce data, interesting clusters or "cohorts" may be identified. The methods are generally data-agnostic: they identify clumps or clusters of similar records, based on the clustering-cost metric, but an investigator must examine the clumped records to discover why they have been grouped together. However, the clustering-cost computation may be adjusted to increase the likelihood that clusters reflect a real-world characteristic of interest to the user.

For example, a similarity metric operating over the e-commerce data described above can ignore the "user ID" element of each record, which will prevent records from clumping based on which user performed the action. Thus, the data clustering process may identify products, times, actions or other characteristics of data records that are similar, and the result may be cohorts of users who behave similarly in an interesting or useful way. One cohort may be users who are interested in fashion products. Another may be users who interact with "on sale" products. Identifying these cohorts may help design procedures or advertising materials that are more effective to reach the cohort.

By ignoring product IDs in the clustering cost, the process may identify clumps of products that experience similar user activity. For example, the analysis may show that "on sale" products are purchased more often on a particular day of the week, or at a particular time of day. (Time-based cohort groupings may also depend on derived data, since timestamps are typically provided with respect to a single time zone, such as the server's time zone. But it is often less interesting to know what time it was at the server when an event occurred, than to know what time it was at the user's location when the user performed the action.)

Other cohorts that may be identified include time-related activity spikes and geographic location-related activity.

Practical Optimizations

It is appreciated that the selection of s records for the medoid-swap process can re-use the results for a previous iteration with a smaller s. For example, if one iteration uses 1,000 records and the next iteration uses 5,000 records, only 4,000 new records need be processed (the first 1,000 results can be re-used).

In a naïve, implementation, the initial candidate medoids might be selected at random (without replacement), but techniques developed for prior-art medoid searches can also be applied here. For example, the "$k$-means++" algorithm described in 2007 by David Arthur and Sergei Vassilvitskii[2] can be used to "jump start" the inventive procedure and reduce the number of rounds of s-subset clustering-cost approximations required.

[2] "$k$-means++: the advantages of careful seeding," *Proceedings of the eighteenth annual ACM-SIAM symposium on Discrete algorithms.* Society for Industrial and Applied Mathematics Philadelphia, Pa., USA. pp. 1027-1035

Statistics about the records in a dataset may be collected during data import, and used to set an initial value for s. This is possible (and effective) because the accuracy of a Monte Carlo approximation depends on the statistical distribution (e.g., the variance) of the data records from which random samples are taken, not just on the number or proportion of samples taken. In other words, although it is generally true that a Monte Carlo analysis based on a sample of 50% of the records is more accurate than a Monte Carlo analysis based on only 25% of the records, it does not follow that one must (or should) use at least X % of the records in a dataset. And the countervailing incentive to use fewer records is that fewer records permit analysis of larger datasets (with an equivalent level of accuracy, and with equivalent expenditure of computing resources). Thus, in an embodiment, s is preferably chosen without reference to the number of records in the full dataset, and when it is necessary to increase s, the magnitude of increase is also chosen without regard to the size of the full dataset.

In one practical embodiment, s starts at 100 and is increased by a factor of between 2 and 10 when more accuracy is desired. In another embodiment, s may start at 500 and increase proportionally to the amount by which the error estimate exceeds the desired accuracy. For example, if accuracy of ±5% is desired, but the estimated error after an iteration is ±20%, then s may be increased by 3 times a base multiple, whereas if the estimated error after an iteration is only ±8%, s may be increased by the base multiple alone.

In one situation, however, s may be compared to the full dataset size: if s over a series of iterations is increased so that it exceeds a predetermined proportion of the full dataset size, operations of an embodiment may be limited to that value for s, notwithstanding that the estimated accuracy of the clustering-cost approximation has not reached the desired value.

An embodiment of the invention may be a machine-readable medium, including without limitation a non-transient machine-readable medium, having stored thereon data and instructions to cause a programmable processor to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In some embodiments, the instructions for a programmable processor may be treated as data and used to modulate a carrier signal, which can subsequently be sent to a remote receiver, where the signal is demodulated to recover the instructions, and the instructions are executed to implement the methods of an embodiment at the remote receiver. In the vernacular, such modulation and transmission are known as "serving" the instructions, while receiving and demodulating are often called "downloading." In other words, one embodiment "serves" (i.e., encodes and sends) the instructions of an embodiment to a client, often over a distributed data network like the Internet. The instructions thus transmitted can be saved on a hard disk or other data storage device at the receiver to create another embodiment of the invention, meeting the description of a non-transient machine-readable medium storing data and instructions to perform some of the operations discussed above. Compiling (if necessary) and executing such an embodiment at the receiver may result in the receiver performing operations according to a third embodiment.

In the preceding description, numerous details were set forth. It will be apparent, however, to one skilled in the art, that the present invention may be practiced without some of these specific details. In some instances, well-known structures and devices are shown in block diagram form, rather than in detail, in order to avoid obscuring the present invention.

Some portions of the detailed descriptions may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including without limitation any type of disk including floppy disks, optical disks, compact disc read-only memory ("CD-ROM"), and magnetic-optical disks, read-only memories (ROMs), random access memories (RAMs), erasable, programmable read-only memories ("EPROMs"), electrically-erasable read-only memories ("EEPROMs"), magnetic or optical cards, or any type of media suitable for storing computer instructions.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will be recited in the claims below. In addition, the present invention is not described with reference to any particular programming language. It will be appreciated that a variety of programming languages may be used to implement the teachings of the invention as described herein.

The applications of the present invention have been described largely by reference to specific examples and in terms of particular allocations of functionality to certain hardware and/or software components. However, those of skill in the art will recognize that identification of approximately optimal medoids of a large and heterogeneous dataset can also be achieved by software and hardware that distribute the functions of embodiments of this invention differently than herein described. Such variations and implementations are understood to be captured according to the following claims.

We claim:

1. A method implemented by a processor coupled to a memory, comprising:
   collecting a plurality of n observations of users interacting with an electronic-commerce website and storing the n observations as a plurality of n data records in a database;
   retrieving the n data records from the database, each data record comprising a plurality of elements, said plurality of elements including at least one quantitative element and at least one qualitative element;
   identifying a subset of k candidate medoids from the n data records;
   selecting a subset of s sample records at random from the n data records;
   computing an approximate clustering cost as a distance between each of the s sample records and a nearest one of the k candidate medoids;
   replacing one of the k candidate medoids with one of the n data records not part of the k candidate medoids to produce a new set of k' candidate medoids;
   recomputing an updated approximate clustering cost as a distance between each of the s sample points to a nearest one of the k' candidate medoids; and
   repeating the replacing and recomputing operations to identify an approximately-optimal subset of k medoids from the n data records and a lowest approximate clustering cost of the approximately-optimal subset of k medoids, wherein
   the updated approximate clustering cost is lower than the approximate clustering cost, and
   displaying the approximately-optimal subset of k medoids to show k specific user interactions with the electronic-commerce website that are approximately most-similar to clusters among the plurality of n observations stored in the database, wherein
   n, k, k' and s are positive integers.

2. The method of claim 1, further comprising:
   estimating an error discrepancy between the lowest approximate clustering cost and a true clustering cost computed as a distance between each of the $n$ data records and the approximately-optimal subset of $k$ medoids; and
   if the error discrepancy exceeds a predetermined value, then
   increasing a size of the subset of s sample records; and
   repeating the identifying, selecting, computing, replacing and recomputing operations to identify an improved-accuracy subset of $k$ medoids.

3. The method of claim 1 wherein identifying comprises selecting $k$ candidate medoids at random from the plurality of $n$ data records.

4. The method of claim 1 wherein identifying comprises selecting $k$ candidate medoids by a $k$—means++ algorithm from the plurality of $n$ data records.

5. The method of claim 1 wherein the repeating implements a greedy search for the approximately-optimal subset of $k$ medoids.

6. The method of claim 1 wherein the repeating implements an exhaustive search for the approximately-optimal subset of $k$ medoids.

7. The method of claim 1, further comprising:
repeating the identifying, selecting, computing, replacing and recomputing operations for a series of integer values for $k$ to produce a corresponding series of approximately-optimal sets of $k$ medoids; and
emitting a preferred value for $k$ where an approximate clustering cost for the preferred value for $k$ decreases by less from ($k$ to $k+1$) than the approximate clustering cost decreased from ($k-1$ to $k$).

8. The method of claim 1 wherein $k$ is equal to a number of elements of a data record of the $n$ data records.

9. The method of claim 1 wherein selecting a subset of s sample records is selecting s data records from the plurality of $n$ data records with replacement.

10. The method of claim 1 wherein s is between 5% of $n$ and 15% of $n$.

11. The method of claim 1 wherein each data record of the plurality of $n$ data records comprises a quantitative size element and a qualitative color element.

12. A tangible computer-readable medium containing data and instructions to cause a programmable processor to perform operations comprising:

collecting a plurality of n observations of users interacting with an electronic-commerce website and storing the n observations as a plurality of n data records in a database;

electronically accessing the plurality of n data records stored in the computer database, each data record comprising a plurality of elements, said plurality of elements including at least one quantitative element and at least one qualitative element;

identifying a subset of k candidate medoids from the n data records;

selecting a subset of s sample records at random from the n data records;

computing an approximate clustering cost as a distance between each of the s sample records and a nearest one of the k candidate medoids;

replacing one of the k candidate medoids with one of the n data records not part of the k candidate medoids to produce a new set of k' candidate medoids;

recomputing an updated approximate clustering cost as a distance between each of the s sample points to a nearest one of the k' candidate medoids, and repeating the computing and replacing operations to identify an approximately-optimal subset of k medoids from the n data records and a lowest approximate clustering cost of the approximately-optimal subset of k medoids, wherein the updated approximate clustering cost is lower than the approximate clustering cost; and emitting the approximately-optimal subset of k medoids as best representative data records of k clusters of records among the n data records, wherein n, k, k' and s are positive integers.

* * * * *